INVENTOR.
GEORGE E. MINNICH
ALEXANDER J. URQUHART
BY William Grobman

United States Patent Office 3,538,624
Patented Nov. 10, 1970

3,538,624
AIRCRAFT SIMULATION
George E. Minnich, Vestal, and Alexander J. Urguhart, Binghamton, N.Y., assignor to Singer-General Precision, Inc., Binghamton, N.Y., a corporation of Delaware
Filed Sept. 9, 1968, Ser. No. 758,259
Int. Cl. G09b 9/08
U.S. Cl. 35—12
7 Claims

ABSTRACT OF THE DISCLOSURE

In fixed-base cockpit trainers for simulating the flight characteristics of aircraft, the pitch and roll accelerations are often simulated to produce in the mind of the trainee the impressions he would receive in the actual aircraft. One form of these motions is produced by what is known as "rough air." The effect of rough air is to buffet the trainee in the cockpit. This effect can be introduced by the instructor, if there is one, or automatically by programming it into the training course. One device for producing the effects of rough air is described in this invention. The scheme devised herein is for use in solid state electronic analog computer systems and includes two channels of transmission through the system. A white noise source is multiplexed into the two channels by means of a free-running multivibrator. Since the energy content of low frequency (below 5 Hz.) random noise is very low, a multiplexing system is employed. The effect of the multiplexing is to mix the output of the multivibrator with the random noise and produce useable noise in the low frequency range. Active filters in each channel filter out all but the low frequency components, the difference components, which are passed-on to the pitch and roll computer sections. In those computer sections, the input signals from the rough air generator are used as inputs to affect the computations of the pitch and the roll. In addition, a slightly higher frequency signal is bled off to control the airspeed indicator to duplicate the effect of rough air on the pitot tube in the aircraft.

---

This invention relates to simulators for duplicating the characteristics of aircraft in flight and, more particularly, to the effects of rough air on grounded base training cockpits.

For the realistic training of future pilots, the fidelity of operation of the system should include as many actual characteristics of an aircraft in flight as possible. One of the flight characteristics is that produced when an aircraft encounters turbulenece in the atmosphere. Unless a pilot is trained to overcome the effects of turbulence, he can rapidly get into trouble in rough air. The duplication of the effects of turbulence in a fixed-base cockpit trainer can assume any of several forms depending upon the type of trainer. In the older Link trainers which were moved by a pneumatic or vacuum system turbulence could be introduced by the rapid movement of a control valve. In later systems which utilize hydraulically driven motion systems, and which included digital computers to compute or calculate the electrical analogs of the flight characteristics, rough air was often produced as a computer program. The digital computer would, in effect, produce a random variation which was then transmitted further to control the hydraulic motion system. More recent developments have been small, general-purpose aviation trainers which use electrically driven motion systems and solid state analog computers. In the analog computers, the flight equations for the particular type of aircraft being simulated are continually being computed and the electrical results of those computations are fed to the motor control systems to produce the desired effects in pitch and roll. This invention introduces a new means for developing electrical signals to be used in the computations of such an analog computer.

It is an object of this invention to provide a new and improved system for duplicating the effects of aircraft flight characteristics on a fixed-base cockpit trainer.

It is another object of this invention to provide a new and improved system for modifying the operation of a fixed-base cockpit trainer.

It is a further object of this invention to provide a system for randomly modifying the operation of a vehicle motion system.

It is still another object of this invention to provide a new and improved rough air generator for use with vehicle simulators having motion systems.

Other objects and advantages of this invention will become more apparent as the following description proceeds which description should be considered together with the accompanying drawings in which.

Figure 1:
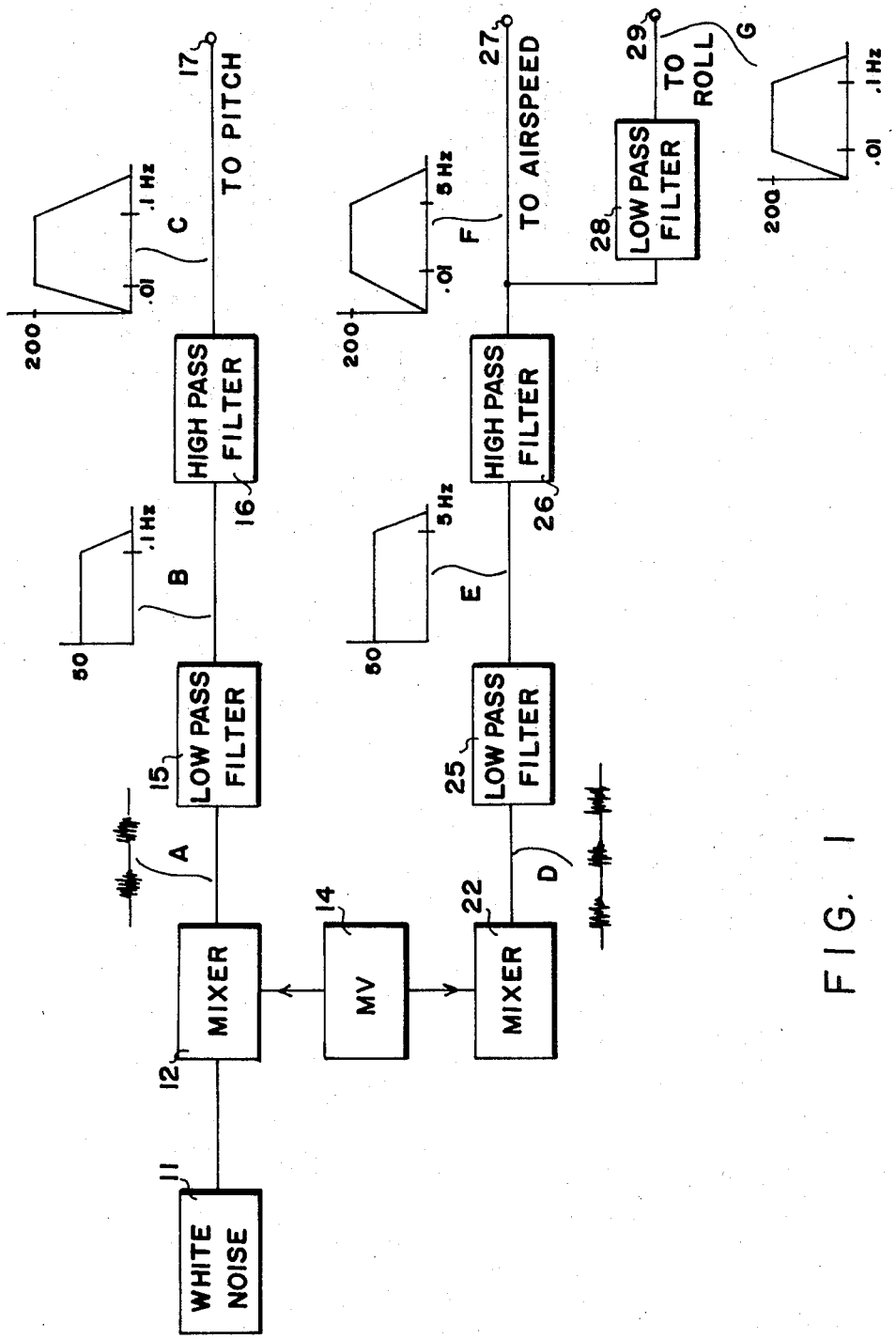
FIG. 1 is a block diagram of a generator in accordance with this invention.

Referring now to the drawings in detail and more particularly to FIG. 1, the reference character 11 designates a source of white noise. The output from the white noise source 11 feeds the inputs to two separate channels. The first channel comprises a mixer 12 the output of which is applied to the input of a low pass filter 15 which then feeds a high pass filter 16. The output of the high pass filter 16 is applied to an output terminal 17 which can be connected to one input of a computer which computes the pitch equations. The second channel comprises a mixer 22 whose output is applied to the input of a low pass filter 25 which feeds a high pass filter 26. The output of a high pass filter 26 is simultaneously applied to an output terminal 27 which can be connected to an airspeed indicator and to an input of another low pass filter 28 whose output feeds a terminal 29 which can be connected to a roll input of the computer. A free-running multivibrator 14 has two outputs, one of which feeds the mixer 12 and the other of which feeds the mixer 22.

The white noise source 11 generates random electrical signals of a wire band of frequencies. Although the output of the source 11 is applied simultaneously to the inputs to the two mixers 22 and 12, the multivibrator 14, in effect, duplexes the output from the white noise source 11 and renders one of the two mixers 12 and 22 operative during each half-cycle of its output. The multivibrator 14 can operate at any convenient frequency within the useable noise spectrum, and its signals are mixed in the mixers 12 and 22 with the random signals from the source 11. The low pass filters 15 and 25 receive the outputs of the mixers 12 and 22, respectively, and pass only those signals which have frequencies below the cutoff frequency of the filter. Since the amount of energy contained in the low frequency components of white noise is very low in comparison to the energy contained in the higher frequency signals, the white noise is mixed with the output of the multivibrator 14. The two low pass filters 15 and 25 are, in effect, difference filters and pass only those signals which have frequencies which are the difference between the frequency of the multivibrator 14 and the signals from the source 11. Thus, the signals which are passed through the low pass filters 15 and 25 are of substantially higher energy content than are the original low frequency signals generated by the source 11.

Since rough air, or turbulence in the atmosphere, occurs at relatively low frequencies and since its effects upon a relatively slow moving aircraft (below 100 miles per hour, for example) are superimposed upon the motion of the aircraft itself, the result upon the aircraft occurs at very low frequencies. For example, modifications to the pitch and the roll of an aircraft in flight usually take place at frequencies of one cycle per second or less. For this reason, the low pass filter 15 has a shoulder or roll-off portion at 0.1 cycle per second. The output of the low pass filter 15 is applied to a "high pass" filter 16 which passes only those signals having a frequency higher than 0.01 cycle per second. Thus, the final output signals applied to the terminal 17 are random signals which lie between 0.01 and 0.1 cycle per second. When this random effect is applied to that portion of the computer which calculates the pitch equations for the aircraft, it modifies the pitch in a random manner at frequencies which lie between 0.01 and 0.1 cycle per second.

In addition to the effect upon pitch and roll of an aircraft in flight, air turbulence also affects the operation of the pitot tube which senses air speed. Because the pitot tube extends outwardly from the aircraft itself, the turbulence effects are at a slightly higher frequency than the effects on the pitch and roll of the aircraft. Therefore, the low pass filter 25 in the second channel has a cutoff shoulder at about 5 cycles per second. The information applied to the low pass filter 25 is essentially the same as the information applied to the low pass filter 15, but its output is at a higher frequency and the noise variations are completely independent. When the output of the low pass filter 25 is applied to the low pass filter 26, which has a cutoff shoulder at 0.01 cycle per second, the output of the filter 26 applied to the output terminal 27 is a series of random variations which occur at frequencies lying between 0.01 and 5 cycles per second. The output terminal 27 can be connected to the airspeed indicator, through an amplifier if desirable, so that the indications of the airspeed indicator are modified by the random signals.

The output of the high pass filter 26 is also applied to the input of a second low pass filter 28. This low pass filter 28 can be identical with the low pass filter 15. The effect of the filter 28 is to narrow the pass band of frequencies to the range between 0.01 and 0.1 cycle per second. This information is applied to the output terminal 29 to be fed to the computer portion which computes the roll equations for the aircraft. In this manner, the effect upon roll is modulated by the output of the filter 28.

At each portion of the system shown in block form in FIG. 1 is a curve which gives an indication of the operation of the system at that point. The curves A, B, C, D, E, F and G are supplied for explanatory purposes only. Thus, considering the top channel, the output of the mixer 12 is shown as a series of bursts of oscillations at random frequencies with dead spaces in between. The curve D at the output of the mixer 22 should be essentially identical to the curve A except that the bursts of D occur at the gaps of A. Since the noise is being mixed in the two channels at different intervals, the two channels are independent of each other. The curve B shows the general effect of the low pass filter which passes, at a reasonably constant amplitude, signals below 0.1 cycle per second and whose output begins to rapidly fall off at that frequency. After passing through the high pass filter 16, the curve C shows that the signals shown in curve B now fall off rapidly at both ends, below 0.01 cycle and above 0.1 cycle per second.

Figure 2:
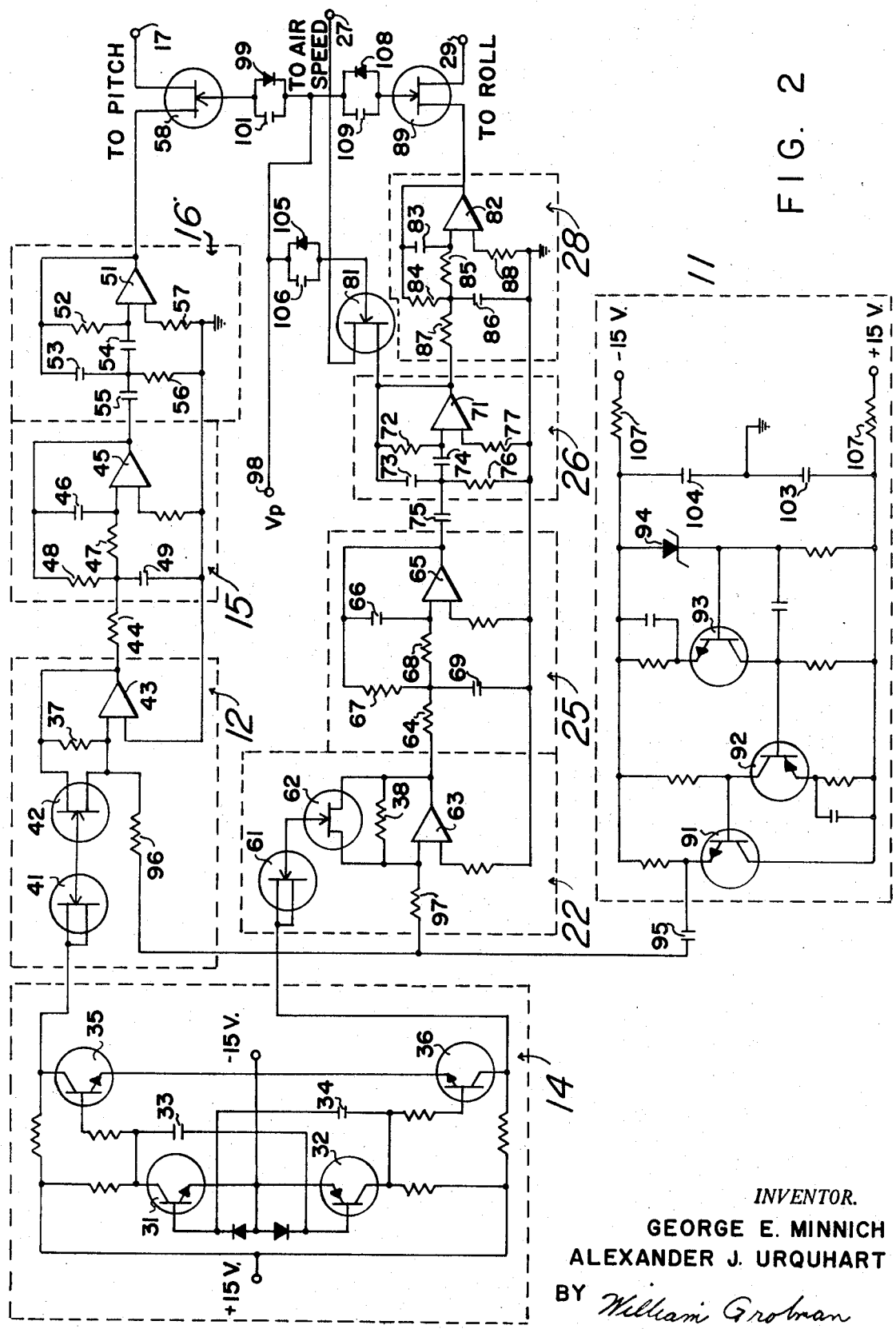
FIG. 2 is a schematic wiring diagram of the system of FIG. 1.

FIG. 2 illustrates the system of FIG. 1 in more detail. Each portion of FIG. 1 is shown in FIG. 2 within dashed lines with the same reference numerals used in FIG. 1. Thus, the white noise source 11 is shown comprising transistors 91, 92 and 93 and a Zener diode 94. The Zener diode 94 is literally the source of white noise, and its noise generation is applied to the base electrode of the transistor 93. The output of the transistor 93 is applied to the transistor 92 which amplifies it and applied the amplified output to the transistor 91 for further amplification. Power is supplied to the white noise source 11 from a source of 15 volts direct current through load resistors 107 and across filter capacitors 103 and 104. The various capacitors and resistors connected to the transistors 91, 92 and 93 are load and coupling impedances. The output of the white noise source 11 ranges in frequency from about 50 cycles per second to 10,000 cycles per second. This is applied through a coupling capacitor 95 to the inputs of the two mixers 12 and 22. The mixer 12 comprises an operational amplifier 43 which has one side grounded and its other side connected through a resistor 96 to the coupling capacitor 95. In addition, the input to the operational amplifier 43 is connected to the drain electrode of a field effect transistor 42. The source electrode of the FET 42 is connected in the feedback path of the operational amplifier 43, and its gate electrode is connected to the gate electrode of a field effect transistor 41. The source and drain electrodes of the transistor 41 are connected together and to one output of the multivibrator 14. Thus, the mixer 12, which comprises the operational amplifier 43 and the two FETs 41 and 42, has applied through a resistor 96 the output of the white source generator 11 and through the FET 41 the output of one side of a multivibrator 14.

The multivibrator 14 comprises a pair of transistors 31 and 32. The base electrode of the transistor 31 is connected to the collector electrode of the transistor 32 through a capacitor 34, and the base electrode of the transistor 32 is connected to the collector electrode of the transistor 31 through a capacitor 33. Thus, together with the resistors which form the time constants and determine the frequency of the multivibrator, the transistors 31 and 32 are cross-connected to provide a free-running oscillator. The output from the transistor 31 is applied through a transistor 35 and the output from the transistor 32 is applied through a transistor 36. Energy is supplied to the multivibrator 14 from a source of 15 volts direct current which could be the same source that supplies the white noise source 11. The operation of the multivibrator 14 is that of a standard multivibrator which is old and well-known and need not be described in detail here. However, since it is important to the operation of the circuit, it must be mentioned that when the transistor 35 is conductive, the transistor 36 is nonconductive so that the output applied to one of the mixers 12 and 22 is high while the output applied to the other mixer is low. In the operation of the mixer 12, the FET 41 serves as a voltage variable capacitor which passes the square wave output from the multivibrator 14 to the gate electrode of the FET 42. When FET 42 is turned on, the low source-to-drain impedance of that FET short-circuits the feedback impedance 37 of the amplifier 43. This interrupts the passage of the white noise applied by the resistor 96 through the amplifier 43. In a sense, this chops the white noise from the source 11.

The mixer 22 of the second channel is similarly constructed and operates in the same manner as the mixer 12. The mixer 22 comprises an operational amplifier 63 having a feedback resistor 38. A FET 62 has its source and drain electrodes connected across the resistor 38 and its gate electrode connected to the gate electrode of a field effect transistor 61 whose source and drain electrodes are connected together and to the output of the transistor 36 in the multivibrator 14. The output of the white noise source 11 is applied to the input of the operational amplifier 63 through a resistor 97. When the output from the transistor 36 is applied through the FET 61, which operates as a voltage variable capacitor, to the gate electrode of the FET 62, that FET is turned on and effectively short circuits the resistor 38. Thus, the output of the operational amplifier 63 is interrupted for each half-cycle output of the multivibrator 14. The two mixers 12 and 22 chop the white noise source on alternate half-cycles.

The filters used in the system of FIG. 2 are, for convenience, active filters. The filter 15 comprises an operational amplifier 45 having a feedback path which includes a capacitor 46, a resistor 48 connected in parallel therewith and a resistor 47 between the two. The output from the mixer 12 is applied through a resistor 44 to the junction of the resistors 47 and 48, which junction is connected to ground through a capacitor 94. As the signals applied to the input of the filter 15 vary in frequency, the operational characteristics of the amplifier 45 are varied due to the time constants provided by the capacitors 46 and 49 and the resistors 47 and 48. Thus, the filter 15 can be arranged to pass at a fairly constant or fixed amplitude signals which are below a desired frequency, in this case 0.1 cycle per second.

The filter 16 is a high pass filter which comprises an operational amplifier 51 having a feedback path which includes a resistor 52 and a capacitor 53. A capacitor 54 is connected in the input to the amplifier 51 with one side connected to one side of the capacitor 53, and a resistor 56 has one end connected to the junction of the capacitors 53 and 54 and its other end grounded. Energy is coupled from the output of the filter 15 to the input of the filter 16 through a capacitor 55. Again, the operational characteristics of the amplifier 51 are varied with the variations in input signal frequency due to the time constants proivded by the resistors 52 and 56 and capacitors 53 and 54. Filter 16 is a high pass filter and its resistors and capacitors are selected to pass signals above a minimum frequency of 0.01 cycle per second. The low pass filter 25, the high pass filter 26, and the low pass filter 28 are similar in construction and operation to the low pass filter 15 and the high pass filter 16. For this reason, their construction and operation will not be discussed in detail herein.

An airspeed voltage is applied to an input terminal 98 and is applied through a combination of a diode 99 and a capacitor 101 to the gate electrode of a field effect transistor 58. The output of the filter 16 is applied to the source electrode of the FET 58 and the output terminal 17 is connected to the drain electrode. Thus, the signal which is applied to the output terminal 17 for application to the pitch portion of the computer is a combination of the airspeed voltage and the output from the filter 16. The airspeed voltage is also applied through a parallel combination of a diode 105 and a capacitor 106 to the gate electrode of a field effect transistor 81. The source electrode of that FET is connected to the output of the filter 26 which is a high pass filter and passes relatively high frequency signals. The drain electrode of FET 81 is connected to the output terminal 27 which is connected to the airspeed indicator. In this way, the output signals applied to the airspeed indicator are those having the higher frequency random noise applied thereon. The airspeed voltage is also applied through the combination of a diode 108 and a capacitor 109 to the gate electrode of a FET 89. The source electrode of FET 89 is connected to the output of the low pass filter 28 and its drain electrode is connected to the output terminal 29 which is, in turn, connected to the roll input of the computer. Thus, the roll input portion of the computer has applied to it the airspeed voltage with the random low frequency random noise superimposed thereon. The field effect transistors 81, 89 and 58 effectively multiply the pitch and roll rough air signals by the airspeed signal so that there are no rough air effect when the airspeed is zero.

The above specification has described a new and improved system for generating rough air signals for use in training devices having motion systems. The apparatus illustrated and described is simple, yet effective and is particularly useful in those vehicle training systems which incorporate solid state analog computers. The random signals which formerly have a low energy content are converted into low frequency signals having a higher energy content by means of an appropriate mixer and the frequency characteristics of the rough air signals are determined by appropriately designed active filters. The overall system as shown and described comprises a new inexpensive but very effective apparatus to accomplish what has been an expensive operation in the past. It is realized that the above description may indicate to others skilled in the art additional ways in which the apparatus of this system may be used without departing from its principles. It is, therefore, intended that this invention be limited only by the scope of the appended claims.

What is claimed is:

1. In a fixed-base aircraft simulator which includes at least means for simulating the effects of aircraft speed, pitch and roll and which also includes electrical means for controlling the simulation of aircraft speed, pitch and roll in response to information from the trainee, the simulated aircraft operation and the simulated environment, apparatus for producing signals to simulate the effects of rough air; said apparatus comprising a noise generator; a first channel and a second channel; a source of alternating signals; first means in said first channel for mixing the output of said noise generator and a first half of the output from said source of alternating signals; second means in said second channel for mixing the output from said noise generator and the other half of the output from said source of alternating signals; first filter means in said first channel for passing a first select band of signal frequencies; second filter means in said second channel for passing a second select band of signal frequencies; and means for applying the outputs of said first and second channels to pitch and roll inputs of said electrical control means so that the output signals from said first and second channels affect the pitch and roll outputs from said control means.

2. The simulator defined in claim 1 where said first filter means in said first channel comprises a first low pass filter and a first high pass filter in series to provide a narrow band having a first high frequency cutoff point.

3. The simulator defined in claim 1 wherein said second filter means in said second channel comprises a second low pass filter, a second high pass filter and a third low pass filter in series to provide a narrow pass band having a first high frequency cutoff point.

4. The simulator defined in claim 2 wherein said second filter means in said second channel comprises a second low pass filter, a second high pass filter and a third low pass filter in series to provide a narrow pass band having said first high frequency cutoff point.

5. The simulator defined in claim 3 further including means connected to the output of said second high pass filter for supplying signals having a second high frequency cutoff point to an airspeed input of said electrical control means to affect the airspeed simulation, said second cutoff point being at a higher frequency than said first cutoff point.

6. The simulator defined in claim 4 further including means connected to the output of said second high pass filter for supplying signals having a second high frequency cutoff point to an airspeed input of said electrical control means to affect the airspeed simulation, said second cutoff point being at a higher frequency than said first cutoff point.

7. The simulator defined in any one of claims 1, 2, 3, 4, 5 or 6 further including a first multiplier interposed in the output from said first channel, a second multiplier interposed in the output from said second channel, and means for applying a signal representative of simulated airspeed applied to said first and second multipliers so that no outputs appear from said first and second channels when the simulated airspeed is zero.

References Cited

UNITED STATES PATENTS

| 3,026,630 | 3/1962 | White et al. | 35—12 |
| 3,422,207 | 1/1969 | Flower et al. | 35—12 X |

FOREIGN PATENTS

| 726,878 | 7/1953 | Great Britain. | |

EUGENE R. CAPOZIO, Primary Examiner

PAUL V. WILLIAMS, Assistant Examiner